(12) United States Patent
Watanabe

(10) Patent No.: US 7,254,480 B2
(45) Date of Patent: Aug. 7, 2007

(54) COMMUNICATION-DATA RELAYING METHOD AND INTER-VEHICLE COMMUNICATION SYSTEM

(75) Inventor: Hisayuki Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 368 days.

(21) Appl. No.: 10/796,791

(22) Filed: Mar. 9, 2004

(65) Prior Publication Data

US 2004/0236499 A1 Nov. 25, 2004

(30) Foreign Application Priority Data

Apr. 8, 2003 (JP) ............................. 2003-103693

(51) Int. Cl.
*G01C 21/00* (2006.01)
(52) U.S. Cl. ..................... 701/200; 701/209; 455/500
(58) Field of Classification Search ................ 701/200, 701/209; 303/116.1; 379/93.01; 399/1, 399/8; 709/219, 227; 710/11
See application file for complete search history.

(56) References Cited

U.S. PATENT DOCUMENTS

| | | | | |
|---|---|---|---|---|
| 5,887,063 A | * | 3/1999 | Varadharajan et al. ...... 713/172 |
| 5,890,054 A | * | 3/1999 | Logsdon et al. ........... 455/11.1 |
| 5,910,179 A | * | 6/1999 | Mohseni ..................... 709/252 |
| 5,943,322 A | | 8/1999 | Mayor et al. |
| 6,154,658 A | * | 11/2000 | Caci ........................... 455/466 |
| 6,405,132 B1 | * | 6/2002 | Breed et al. ................ 701/301 |
| 6,580,981 B1 | * | 6/2003 | Masood et al. ............... 701/29 |
| 6,757,521 B1 | * | 6/2004 | Ying ....................... 455/67.11 |
| 2001/0053699 A1 | * | 12/2001 | McCrady et al. ........... 455/513 |

* cited by examiner

*Primary Examiner*—Thomas Black
*Assistant Examiner*—Marie A Weiskopf
(74) *Attorney, Agent, or Firm*—Brinks Hofer Gilson & Lione

(57) ABSTRACT

Communication data is relayed to vehicle-mounted terminals in vehicles traveling in a particular area via vehicle-mounted terminals in vehicles. Each of the vehicle-mounted terminals functioning as intermediary terminals relays communication data to vehicle-mounted terminals in vehicles existing in a particular direction only until the communication data reaches the vehicle-mounted terminal in the vehicle closest to the target position, i.e., the center of the particular area. The communication data having reached the vehicle-mounted terminal in the vehicle closest to the target position is relayed to surrounding vehicle-mounted terminals through broadcasting.

22 Claims, 7 Drawing Sheets

| ID NO. | VEHICLE POSITION |
|---|---|
| b1 | (X1, Y1) |
| b2 | (X2, Y2) |
| b3 | (X3, Y3) |
| ⋮ | ⋮ |

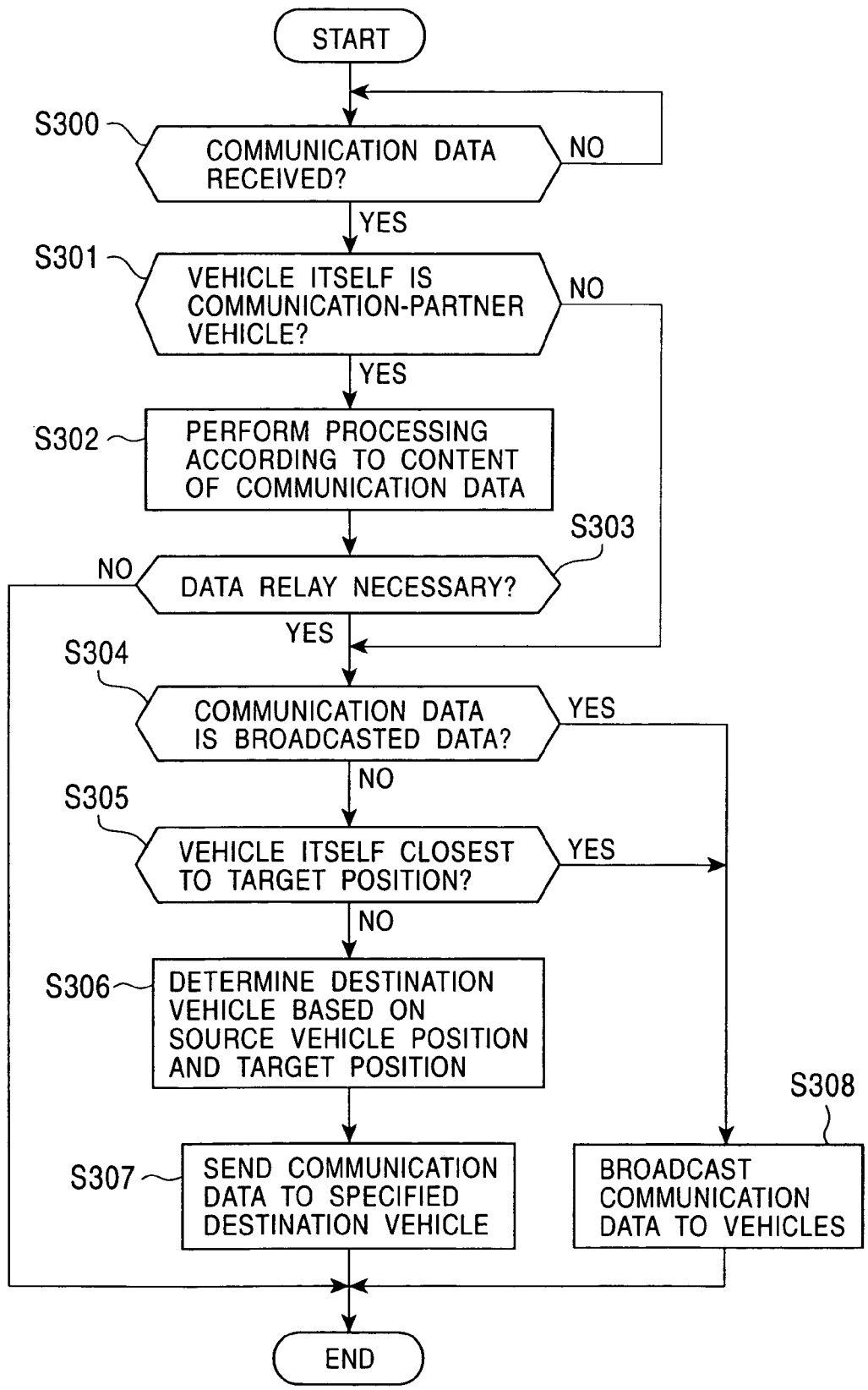

COMMUNICATION-DATA RELAYING METHOD AND INTER-VEHICLE COMMUNICATION SYSTEM

BACKGROUND OF THE INVENTION

1. Field of the Invention

The present invention relates to a communication-data relaying method and an inter-vehicle communication system for sending and receiving communication data containing various messages among vehicles.

2. Description of the Related Art

Inter-vehicle communication systems are known which send/receive communication data among traveling vehicles wirelessly connected to each other, as disclosed in, for example, Japanese Unexamined Patent Application Publication No. 10-47975 (pages 14 to 28 and FIGS. 1 to 44). The inter-vehicle communication system disclosed in this Publication No. 10-47975 is provided with two communication modes, a near-vehicle communication mode and a far-vehicle communication mode, so that the user in a vehicle specifies an area to communicate with other vehicles traveling in the specified area. The near-vehicle communication mode, typically used for communication between vehicles traveling relatively close to each other, allows communication data to be wirelessly sent/received directly between such vehicles. On the other hand, the far-vehicle communication mode, typically used for communication between vehicles traveling relatively far away from each other, requires the user in a first vehicle to specify the area in which a second vehicle to communicate with is traveling, acquire the telephone number of the second vehicle, and dial the number for the second vehicle to send/receive communication data to/from the second vehicle.

Unfortunately, the vehicle to communicate with in the near-vehicle communication mode described above should be traveling within a communication radio-wave reachable range. In general, a first source vehicle can communicate with a second destination vehicle traveling beyond a radio-wave reachable range by using a third intermediary vehicle as a radio-wave relay. This approach, however, does not always ensure that data from the first source vehicle reaches the second destination vehicle, because the first source vehicle, the second destination vehicle, and the third intermediary vehicle are not moving in cooperation with one another. The first source vehicle could broadcast communication data so that nearby vehicles relay the data sequentially up to the second destination vehicle. This approach also poses a problem in that a large amount of communication data results until the data reaches the second destination vehicle, especially if the second destination vehicle is far away from the first source vehicle.

The far-vehicle communication mode described above overcomes these problems by allowing the first source vehicle to dial the number for the second destination vehicle traveling far away within mobile-phone coverage to connect specifically to the second destination vehicle. Although this approach ensures that a minimum required amount of data is used to send data from the first source vehicle to the second destination vehicle, it can be achieved only when a vehicle-mounted terminal database outside the vehicle (telephone central office, for example) is available; that is, it is difficult to employ the far-vehicle communication mode if a new infrastructure cannot be established. Thus, a new communication system has been demanded that overcomes the above-described disadvantages using vehicle-mounted devices only.

SUMMARY OF THE INVENTION

In view of the above-described demand, an object of the present invention is to provide a communication-data relaying method and an inter-vehicle communication system which ensure that communication data is sent from a source vehicle to a destination vehicle, while still preventing an increase in the amount of data.

According to an aspect of the present invention, a method for relaying communication data to a destination terminal in a particular area via intermediary terminals in vehicles includes the steps of repeating relaying the communication data between two of the intermediary terminals such that the communication data is relayed from a first one of the two intermediary terminals to a second communicatable one of the two intermediary terminals, which exists in a first particular direction, until the communication data reaches a communication-partner intermediary terminal mounted in at least one of the vehicles in the particular area; and relaying the communication data towards communicatable intermediary terminals in the vicinity of the second intermediary terminal in any direction, after the communication data reaches the communication-partner intermediary terminal. This reduces communication traffic for efficient utilization of the communication band and ensures that the communication data is relayed to the destination terminal in the particular area.

The first particular direction may be from a source terminal of the communication data to a target position in the particular area. Intermediary terminals which receive the communication data are preferably determined based on the position of the source terminal and the target position. The target position is preferably the center of the particular area to ensure that the communication data is sent to the particular area in which the destination terminal exists.

The vehicle in the particular area is preferably the vehicle closest to the center of the particular area. This ensures that the communication data is sent to all destination terminals in the particular area, as well as further reduces communication traffic because the communication data is relayed to intermediary terminals in vehicles in the particular direction only until the communication data reaches the vehicle closest to the target position.

The communication data is preferably relayed to a communicatable intermediary terminal of the intermediary terminals in the first particular direction after the communicatable intermediary terminal is identified. This reduces a processing load on intermediary terminals receiving the communication data.

The communication data is preferably relayed to a communicatable intermediary terminal of the intermediary terminals in any direction through broadcasting without identifying the communicatable intermediary terminal. This reduces a processing load on intermediary terminals sending the communication data, as well as ensures that the communication data is relayed to other surrounding intermediary terminals.

Broadcasting of the communication data is preferably repeated a predetermined number of times of relaying. Broadcasting of the communication data is preferably repeated as long as the intermediary terminal performing the broadcasting is in the particular area. This prevents endless relaying of unnecessary communication data, thereby reducing communication traffic for efficient utilization of the communication band.

The communication data relayed to the destination terminal preferably includes a predetermined message and a planned driving route of the vehicle having a source terminal which has sent the communication data, and the destination terminal preferably sends communication data containing a response message to the source terminal mounted in the vehicle traveling along the planned driving route. This ensures that a response message is sent back to the source terminal in the traveling vehicle.

Relaying of the communication data containing the response message preferably may be repeated between two of the intermediary terminals such that one of the two intermediary terminals receives the response-message-containing communication data which is relayed to the other communicatable one of the two intermediary vehicles, which is located in a second particular direction, until the response-message-containing communication data reaches one of the intermediary terminals near the source terminal in the vehicle traveling along the planned driving route. After the response-message-containing communication data reaches the intermediary terminal near the source terminal, the response-message-containing communication data is preferably relayed to communicatable intermediary terminals in the vicinity of the other intermediary terminal in any direction. Combining relay of communication data containing a response message in a particular direction and relay of the same communication data in any direction further reduces communication traffic for efficient utilization of the communication band, as well as ensures that the communication data is sent back to the source terminal.

The second particular direction is preferably towards an estimated driving position on the planned driving route, wherein the vehicle having the source terminal travels toward the estimated driving position with an estimated time of response arrival when the response-message-containing communication data reaches the source terminal, and one of the intermediary terminals which receives the response-message-containing communication data is preferably determined based upon the position of the destination terminal and the estimated driving position. This ensures that the communication data is relayed to the traveling vehicle having the source terminal.

The destination terminal preferably calculates the estimated driving position based on the driving speed of the vehicle having the source terminal and the time from when the source terminal sent the communication data to the estimated time of response arrival. This allows the position of the vehicle having the source terminal when receiving the communication data containing the response message to be accurately estimated and ensures that the communication data is sent to the source terminal.

A communication range of communication data relay in the first particular direction is preferably longer than a communication range of communication data relay in any direction. This ensures that the communication data is relayed to the intermediary terminals in vehicles traveling in the particular area even in a situation where vehicles having intermediary terminals are traveling relatively far away from one another and the particular area is far away. Extending the communication range of one data transmission reduces the number of data relays and reduces the communication traffic.

Communication data relay in the first particular direction preferably differs from communication data relay in any direction in a channel, a communication speed, or a communication frequency. Communication near the destination terminal can be discriminated from communication far away from the destination terminal, thereby reducing extra communication traffic.

According to another aspect of the present invention, in an inter-vehicle communication system for sending communication data from a source terminal to a destination terminal in a particular area via at least one of the intermediary terminals mounted in vehicles, each intermediary terminal includes a first receiving segment for receiving communication data sent from the source terminal or another of the intermediary terminals; a determining segment for determining whether or not a condition is satisfied, the condition indicating that the intermediary terminal itself is in the particular area or that the communication data is received from at least another one of the intermediary terminals in the particular area; an intermediary target setting segment for setting another communicatable one of the intermediary terminals in any direction or the destination terminal as an intermediary target when the determining segment determines that the condition is satisfied or for setting another communicatable one of the intermediary terminals in a first particular direction or the destination terminal as an intermediary target when the determining segment determines that the condition is not satisfied; and a first sending segment for sending the communication data to the intermediary terminal or the destination terminal as the intermediary target determined by the intermediary target setting segment. This reduces communication traffic for efficient utilization of the communication band and ensures that the communication data is relayed to the destination terminal in the particular area.

The intermediary terminal preferably further includes a terminal-detecting segment for detecting other intermediary terminals or the destination terminal in a communication range at predetermined intervals. This allows intermediary terminals in vehicles in the particular direction to be detected and ensures that the communication data is sent to the detected intermediary terminals only.

The communication data sent from the source terminal preferably includes the vehicle position of the vehicle having the source terminal and a target position in the particular area, and the intermediary target setting segment determines the first particular direction based on the information regarding these positions. This ensures that the communication data is relayed towards the particular area in which the destination terminal exists.

The communication data sent from the source terminal preferably includes a planned driving route of the vehicle having the source terminal, and the destination terminal preferably includes a second receiving segment for receiving the communication data via one of the intermediary terminals and a second sending segment for sending communication data containing a response message to the source terminal mounted in a vehicle traveling along the planned driving route. This ensures that a response message is sent back to the source terminal in the traveling vehicle.

The communication data sent from the source terminal preferably further includes a transmission-start time when the communication data was sent; the destination terminal preferably further includes an estimated-arrival-time calculating segment for calculating an estimated time of response arrival when the communication data containing the response message reaches the source terminal based on the planned driving route and the transmission-start time contained in the communication data received by the second receiving segment and the driving speed of the vehicle having the source terminal; the communication data sent from the second sending segment in the destination terminal preferably includes an estimated driving position on the planned driving route along which the vehicle having the destination terminal is traveling at the estimated time of response arrival; and the intermediary target setting segment of one of the intermediary terminals which receives the communication data containing the response message preferably determines a second particular direction in which the communication data is relayed based upon the position of the destination terminal and the estimated driving positions and, relays the communication data to another communicatable one of the intermediary terminals in the second particular direction. This allows the position of the vehicle having the source terminal when receiving the communication data containing the response message to be estimated and ensures that the communication data is sent to the source terminal.

According to the present invention, communication data is relayed to the intermediary terminals mounted in vehicles existing in a particular direction only until the communication data reaches a specified vehicle in a particular area, thereby reducing the communication traffic for efficient utilization of the communication band. In addition, the communication data having reached the specified vehicle in the particular area is relayed to intermediary terminals in any direction, and therefore does not fail to reach the destination terminal in the particular area.

BRIEF DESCRIPTION OF THE DRAWINGS

FIG. 8 is a flowchart showing how a vehicle other than the message-sending source vehicle operates when receiving communication data.

DESCRIPTION OF THE PREFERRED EMBODIMENTS

Embodiments of the present invention will now be described in detail with reference to the attached drawings.

Figure 1:
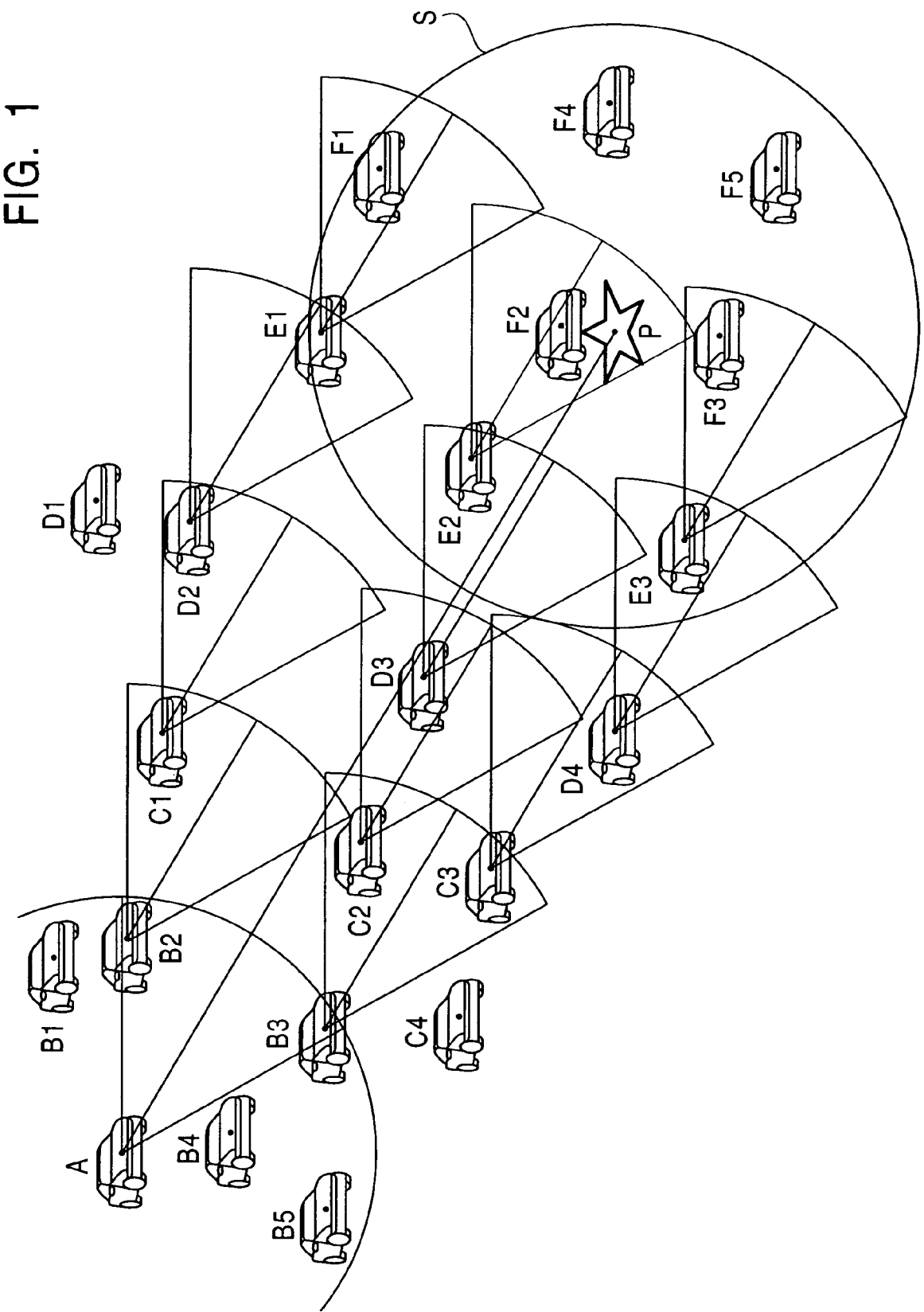
FIG. 1 is a schematic diagram illustrating data transmission in an inter-vehicle communication network system according to an embodiment of the present invention.

FIG. 1 is a schematic diagram illustrating data transmission in an inter-vehicle communication network system according to an embodiment of the present invention. In this inter-vehicle communication network system, vehicle A sends message-containing communication data to other vehicles traveling in a particular area S in the following manner. The communication data is relayed only in the direction towards the area S until it reaches near a particular point (target position) within the area S and, once the communication data reaches near the particular point within the area S, it is broadcast to other vehicles.

Figure 2:
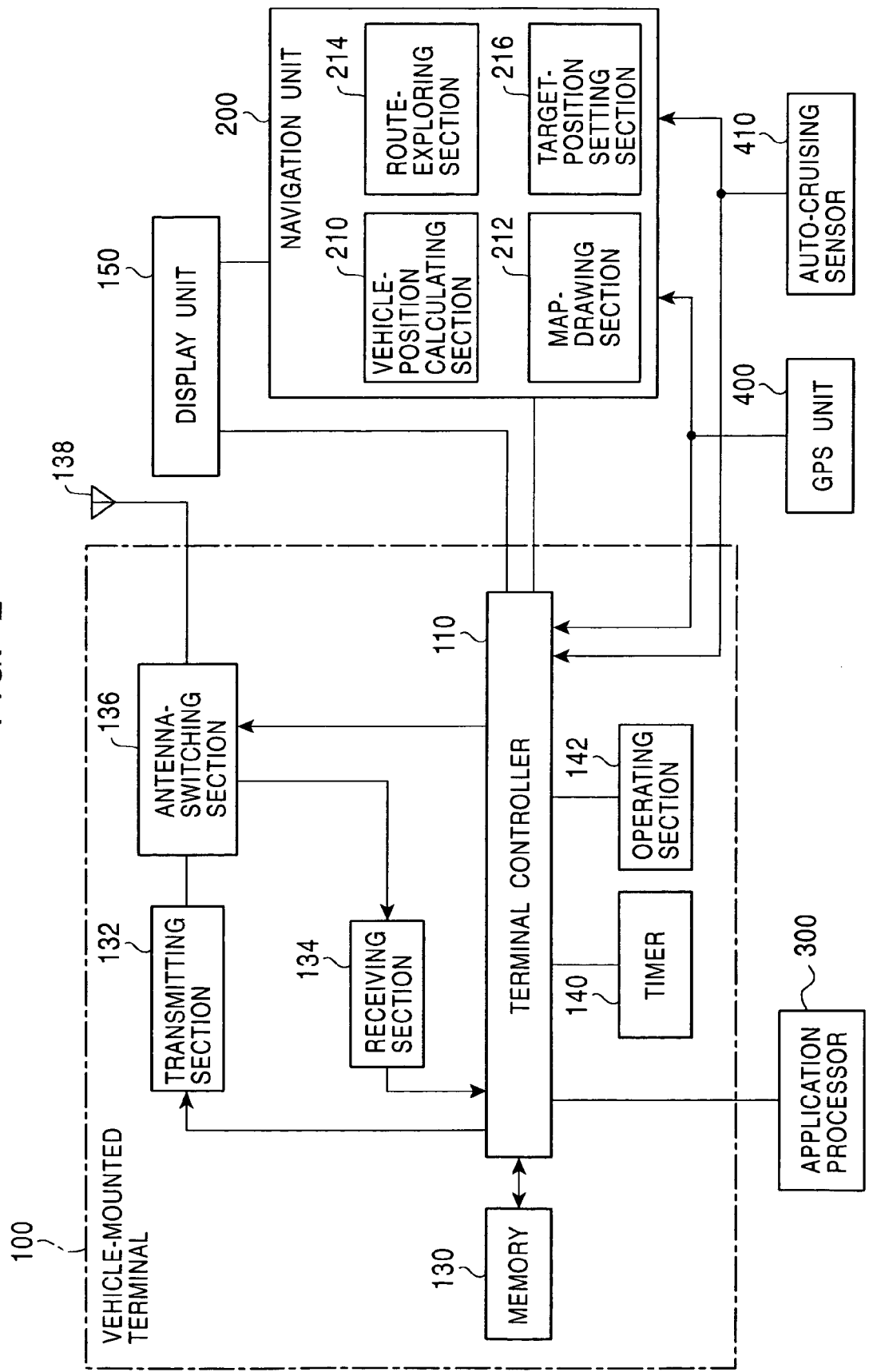
FIG. 2 shows the entire structure of a vehicle-mounted apparatus in each of the vehicles associated with transmission/reception of communication data.

FIG. 2 shows the entire structure of a vehicle-mounted apparatus in each of the vehicles associated with transmission/reception of communication data. The vehicle-mounted apparatus includes a vehicle-mounted terminal 100, a display unit 150, a navigation unit 200, an application processor 300, a GPS unit 400, and an auto-cruising sensor 410.

The vehicle-mounted terminal 100 in a vehicle sends/receives communication data in a predetermined format to/from the vehicle-mounted terminals 100 in other vehicles through wireless communication. To this end, the vehicle-mounted terminal 100 includes a terminal controller 110, a memory 130, a transmitting section 132, a receiving section 134, an antenna-switching section 136, an antenna 138, a timer 140, and an operating section 142.

The terminal controller 110 executes a predetermined operation program stored in the memory 130 to control the entire operation of the vehicle-mounted terminal 100. In addition to the operation program described above, the memory 130 stores an identification number assigned to this vehicle-mounted terminal 100, user information, and other information.

The transmitting section 132 sends a signal generated by modulating transmission data output from the terminal controller 110 to other vehicles via the antenna-switching section 136 and the antenna 138. The receiving section 134 receives a signal which has been sent from another vehicle and arrived at the antenna 138 via the antenna-switching section 136, and demodulates the signal. The antenna-switching section 136 selectively switches the antenna 138 either to the transmitting section 132 or to the receiving section 134 according to the send/receive switching signal coming from the terminal controller 110.

The timer 140 measures the current time. The operating section 142 provides the user with a means for entering some instructions.

As shown in FIG. 2, the display unit 150 is connected to the vehicle-mounted terminal 100 and the navigation unit 200 to display thereon various operating screens and setting screens, as well as map images output from the navigation unit 200.

The navigation unit 200 performs various types of navigation, and includes a vehicle-position calculating section 210, a map-drawing section 212, a route-exploring section 214, and a target-position setting section 216. The GPS unit 400 and the auto-cruising sensor 410 are connected to the navigation unit 200. The GPS unit 400 includes a GPS antenna and an arithmetic-operating section for analyzing satellite radio-waves received through the GPS antenna to output a vehicle-position signal which indicates the position (latitude and longitude) of the vehicle itself. The auto-cruising sensor 410 includes a vehicle-speed sensor which measures vehicle-speed pulses output at predetermined intervals to detect the vehicle speed and an azimuth sensor which detects the vehicle orientation according to the output from a gyroscope, and outputs these sensor detection signals. The information regarding the position of the vehicle itself output from the GPS unit 400 and the sensor detection signals output from the auto-cruising sensor 410 are also passed to the vehicle-mounted terminal 100.

The vehicle-position calculating section 210 calculates the vehicle position based on the vehicle-position signal output from the GPS unit 400 and the sensor detection signals output from the auto-cruising sensor 410. For an accurate calculation of the vehicle position, processing such as map matching where the vehicle track is compared against the shapes of roads on the map is performed. The map-drawing section 212 draws a map showing the position of the vehicle itself as calculated by the vehicle-position calculating section 210, as well as its surroundings. The drawn-map image is displayed on the display unit 150. The route-exploring section 214 explores a route to the destination and guides the vehicle itself along this route. To guide the vehicle itself, for example, an image showing a driving route is drawn and then superimposed on the map image. The target-position setting section 216 sets the target position in the particular area S, namely the position which communication data is intended to reach, using the map display function of the navigation unit 200.

The application processor 300 instructs the vehicle-mounted terminal 100 to send a message and performs specified processing according to a received message. The application processor 300 is realized by, for example, a vehicle-mounted computer.

Figure 3:
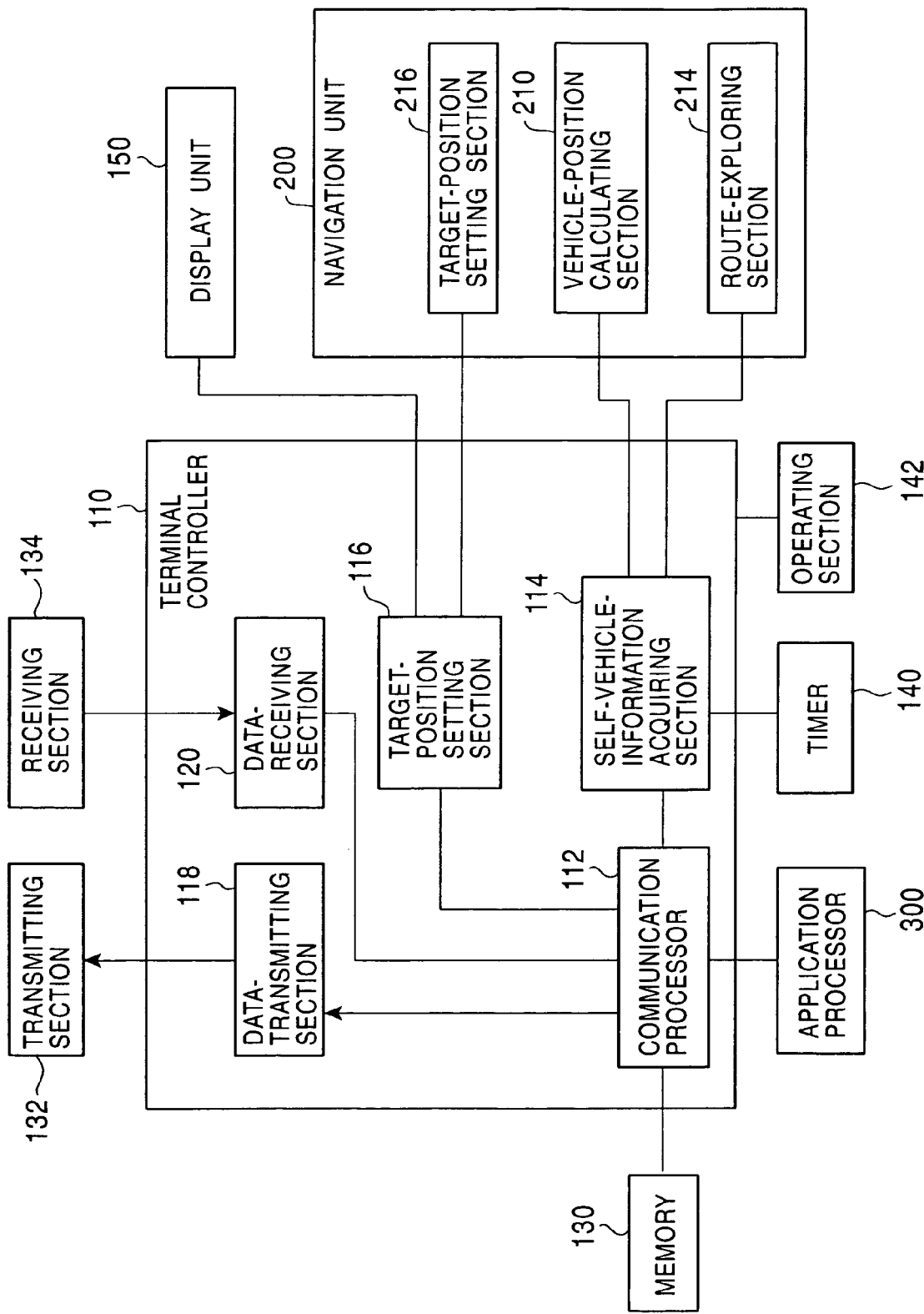
FIG. 3 is a functional block diagram showing in detail the structure of a terminal controller.

FIG. 3 is a functional block diagram showing in detail the structure of the terminal controller 110. The terminal controller 110 includes a communication processor 112, a self-vehicle-information acquiring section 114, a target-position setting section 116, a data-transmitting section 118, and a data-receiving section 120.

The communication processor 112 is in charge of a series of processing steps associated with communication-data transmission/reception by the terminal controller 110. When receiving a transmission message from the application processor 300, for example, the communication processor 112 generates communication data containing this message. When receiving message-containing communication data, the communication processor 112 extracts this message from the communication data to send it to the application processor 300 or relay it to other vehicles.

When the vehicle itself is a source vehicle sending message-containing communication data, the self-vehicle-information acquiring section 114 acquires self-vehicle information including the position of the vehicle itself, the transmission-start time when communication data transmission started, the planned driving route, and the driving speed. In detail, the result of the calculation by the vehicle-position calculating section 210 of the navigation unit 200 is used as the position of the vehicle itself; the current time measured by the timer 140 (or the time obtained by adding a predetermined time to the current time) is used as the transmission-start time; the route obtained by the route-exploring section 214 performing route exploration is used as the planned driving route; and the speed detected by the vehicle-speed sensor in the auto-cruising sensor 410 is used as the driving speed.

The target-position setting section 116 sets a target position which is a particular point within a particular area, namely, the area towards which a message is sent within which other vehicles are traveling. If the application processor 300 already has set a target position, it is used as the target position. The target position may be set using the operating section 142 of the vehicle-mounted terminal 100. For example, the operating section 142 can be operated to enter an address, latitude and longitude, particular cross-section name, etc. while a target-position setting screen appears on the display unit 150, thus specifying a target position. The target section also may be set using the navigation unit 200; for example, the operating section 142 (or an operating section dedicated to the navigation unit 200, if any) can be operated to specify a location on the map image displayed on the display unit 150 by the navigation unit 200.

The data-transmitting section 118 sends communication data from the vehicle-mounted terminal 100 to other vehicles. The communication data output from the data-transmitting section 118 is sent from the antenna 138 via the transmitting section 132 and the antenna-switching section 136.

The data-receiving section 120 receives communication data sent from another vehicle. This communication data is received at the receiving section 134 via the antenna 138 and the antenna-switching section 136 and then input to the data-receiving section 120.

Figure 4:
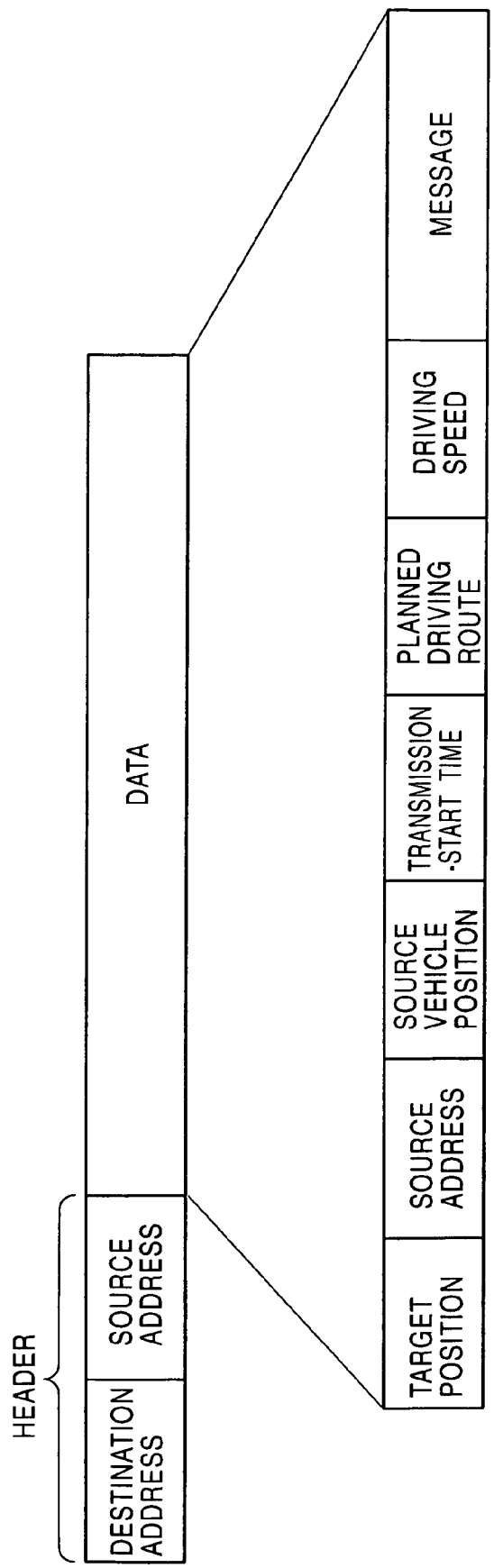
FIG. 4 shows the format of communication data sent/received among vehicles in an inter-vehicle communication system according to an embodiment of the present invention.

FIG. 4 shows the format of communication data sent/received among vehicles in the inter-vehicle communication system according to the embodiment of the present invention. As shown, communication data used in this embodiment includes a header section containing a source address and a destination address; and a data section.

When communication data is sent from a source vehicle to a destination vehicle, the destination address field of the communication data contains an identification number assigned to the vehicle-mounted terminal 100 in the destination vehicle. The source address field contains an identification number assigned to the vehicle-mounted terminal 100 in the source vehicle. When vehicle C1 sends communication data to vehicle D2 as shown in FIG. 1, for example, the destination address field contains an identification number assigned to the vehicle-mounted terminal 100 in vehicle D2 and the source address field contains an identification number assigned to the vehicle-mounted terminal 100 in vehicle C1. These destination and source addresses are used to uniquely identify vehicle-mounted terminals 100, but do not need to be identification numbers of vehicle-mounted terminals 100; they may be any specific information such as vehicle numbers and other types of specific information. When broadcasting is performed in this embodiment, the destination address field is set to have a special value indicating broadcasting.

The data section of communication data contains a message (transmission message) sent from a source vehicle to a destination vehicle and its associated information. For example, when vehicle A sends a message to a vehicle in the area S in FIG. 1, the data section of the communication data, namely the section containing the transmission message, are relayed by intermediary vehicles, such as vehicles B2 and C2, to the destination vehicle in the area S with the message content retained intact.

The data section includes a target position field, a source address field, a source vehicle position field, a transmission-start time field, a planned driving route field, a driving speed field, and a message field. The target position field has the target position specified by the target-position setting section 116 of source vehicle A. The source address field has the identification number of the vehicle-mounted terminal 100 in source vehicle A. The source vehicle position field, transmission-start time field, planned driving route field, and driving speed field have the respective information acquired by the self-vehicle-information acquiring section 114 of source vehicle A.

In the example shown in FIG. 1, the vehicle-mounted terminal 100 of vehicle A corresponds to a source terminal; the vehicle-mounted terminal 100 in each of vehicles B1 to B5, C1 to C4, and D1 to D4 corresponds to an intermediary terminal; and the vehicle-mounted terminal 100 in each of vehicles E1 to E3 and F1 to F5 traveling in the area S corresponds to a destination terminal. The vehicle-mounted terminal 100 in each of vehicles E1 to E3 and F1 to F5 traveling in the area S also serves as an intermediary terminal.

When a vehicle-mounted terminal 100 is an intermediary terminal, the antenna 138, antenna-switching section 136, receiving section 134, and data-receiving section 120 function as a first receiving segment; the communication processor 112 functions as a determining segment, intermediary target setting segment, and a terminal-detecting segment; and the data-transmitting section 118, transmitting section 132, antenna-switching section 136, and antenna 138 function as a first sending segment.

When a vehicle-mounted terminal 100 is a source terminal, the antenna 138, antenna-switching section 136, receiving section 134, and data-receiving section 120 function as a second receiving segment; the communication processor 112 functions as an estimated-arrival-time calculating segment; and the communication processor 112, data-transmitting section 118, transmitting section 132, antenna-switching section 136, and antenna 138 function as a second sending segment.

Now, the structure of the inter-vehicle communication network system according to the embodiment of the present invention has been described. The operation of the same inter-vehicle communication network system follows.

Each of the vehicle-mounted terminals 100 included in the inter-vehicle communication network system according to the embodiment of the present invention acquires, at predetermined intervals, the positions of other vehicles traveling in its communication area and the identification numbers of the vehicle-mounted terminals 100 in those vehicles.

Figures 5, 6:
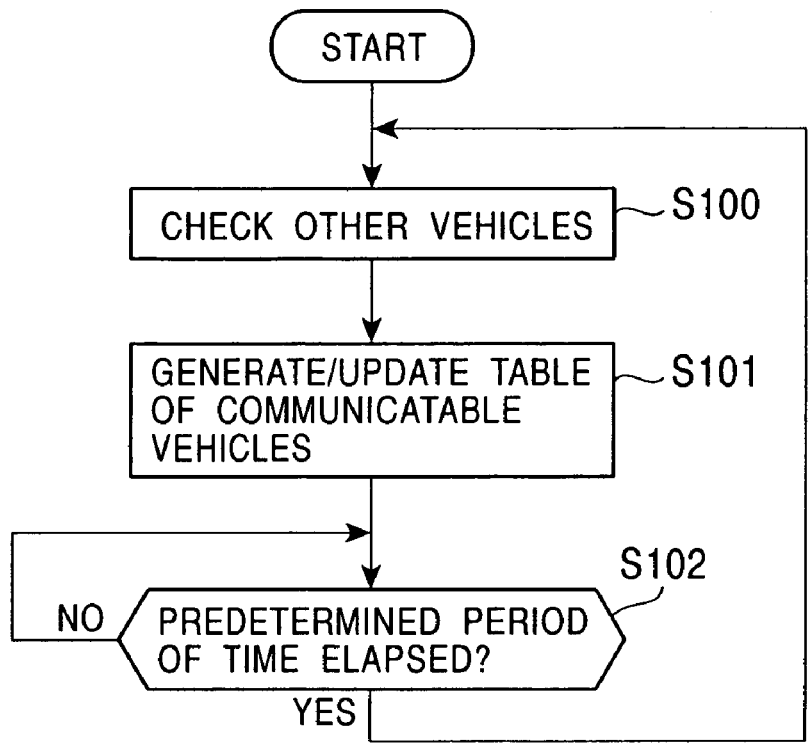
FIG. 5 is a flowchart showing operating procedures for acquiring the positions of other vehicles traveling in a communication area.
FIG. 6 is a table of communicatable vehicles.

FIG. 5 is a flowchart showing the operating procedures for acquiring the positions of other vehicles traveling in the communication area.

The communication processor 112 in the vehicle-mounted terminal 100 of each vehicle sends predetermined confirmation data to other vehicles traveling in the communication area directly reachable to a signal sent from the transmitting section 132 and then receives a response to the confirmation data, thereby acquiring the information regarding these other vehicles (step S100). The data in response to the confirmation data, that is, the data sent by the vehicle-mounted terminal 100 in each of the vehicles that have responded to the confirmation data, contains the position of the responsive vehicle and the identification number of the vehicle-mounted terminal 100 in the responsive vehicle. The communication processor 112 in the vehicle-mounted terminal 100 of each vehicle that has received the response data sent from vehicles in the communication area generates or updates the table of communicatable vehicles (step S101). The generated or updated table is stored in the memory 130.

FIG. 6 is the table of communicatable vehicles generated or updated by, for example, the vehicle-mounted terminal 100 of vehicle A in FIG. 1. As shown in FIG. 6, the table of communicatable vehicles includes vehicle positions (X1, Y1), (X2, Y2), and (X3, Y3) of vehicles B1, B2, and B3, respectively, traveling in the communication area of the vehicle-mounted terminal 100 in vehicle A, as well as the identification numbers b1, b2, and b3 of the vehicle-mounted terminals 100 in vehicles B1, B2, and B3, respectively. This table of communicatable vehicles is generated by the communication processor 112 for each of the vehicles having a vehicle-mounted terminal 100.

After having completed the generation or update of the table, the communication processor 112 determines whether a predetermined period of time has passed since the last transmission of confirmation data (step S102). This determination is repeated while step S102 is false ("NO"). When the predetermined period of time has passed ("YES" at step S102), the flow returns to step S100 so that vehicle A sends the next confirmation data to check other vehicles within the communication area.

Each vehicle, such as vehicle A, in the inter-vehicle communication network system detects information regarding nearby vehicles such as vehicle positions in the manner described above. Thus, the vehicle-mounted terminal 100 of each vehicle, whenever sending communication data to other vehicles within its communication area, is informed of the positions of the other vehicles.

The operating procedures for sending/receiving communication data are described in detail, by way of an example where the vehicle-mounted terminal 100 of vehicle A in FIG. 1 sends communication data, which is then received or relayed by the vehicle-mounted terminals 100 of vehicles other than vehicle A.

(1) Operation of the Vehicle-mounted Terminal 100 in Vehicle A

Figure 7:
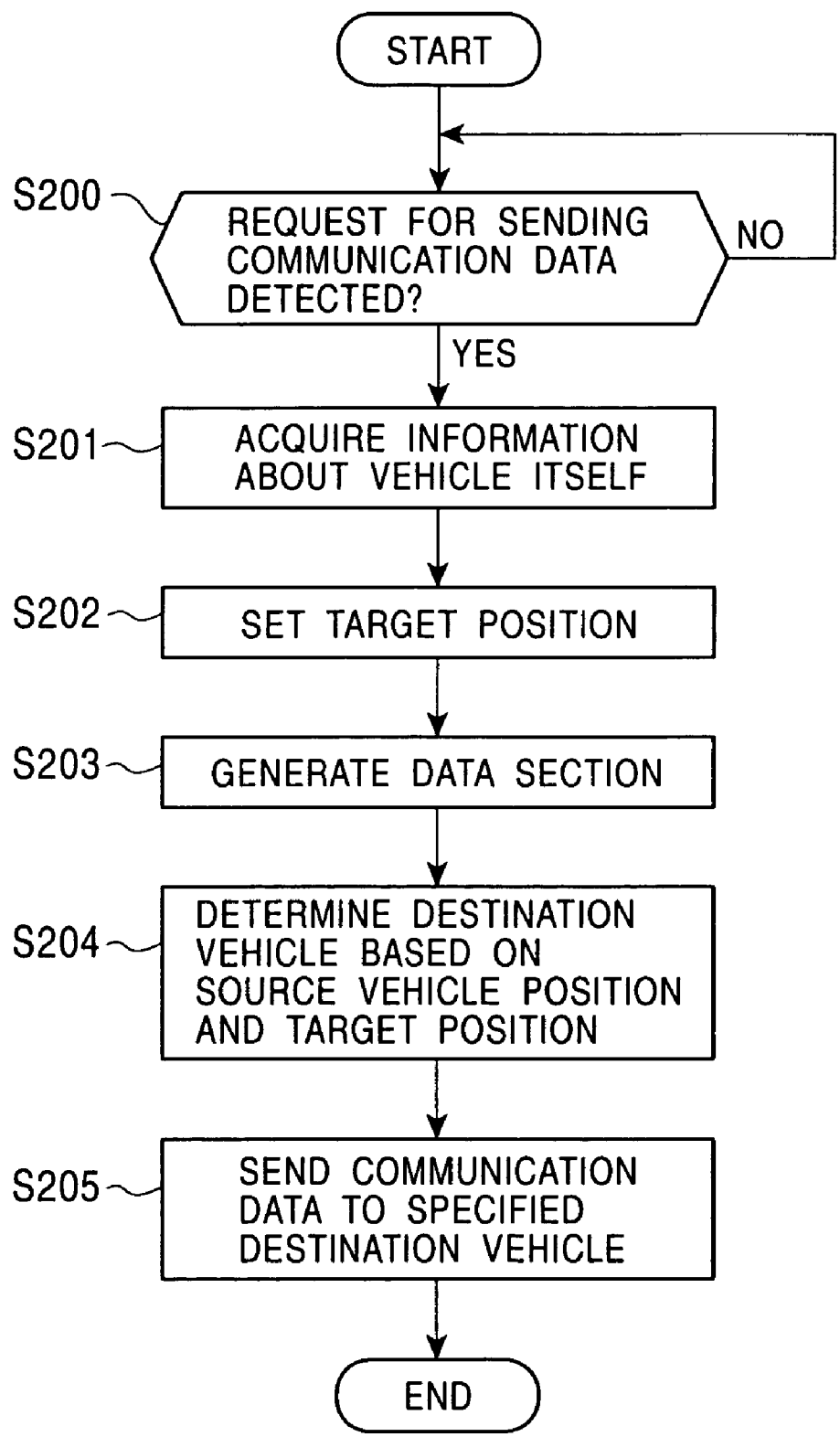
FIG. 7 is a flowchart showing procedures for sending communication data from the vehicle-mounted terminal of a message-sending source vehicle.

FIG. 7 is a flowchart showing the procedural steps for sending communication data from the vehicle-mounted terminal 100 of source vehicle A.

At step S200, the communication processor 112 of vehicle A repeatedly checks to see if the application processor 300 has issued a request for sending communication data. Once the application processor 300 issues a transmission message and the communication processor 112 receives a request from the application processor 300 for sending communication data containing the message ("YES" at step S200), the process proceeds to the subsequent step.

At step S201, the self-vehicle-information acquiring section 114 of vehicle A acquires information regarding the vehicle itself (that is, source vehicle A), such as the position of the vehicle itself (source-vehicle position), communication data transmission-start time, planned driving route, and driving speed. At step S202, the target-position setting section 116 sets as a target position the coordinates of the center P in the particular area S to which the communication data will be sent.

Then, at step S203, the communication processor 112 of vehicle A generates the data section of the communication data in the format shown in FIG. 4 based on the message input by the application processor 300, the information regarding the vehicle itself acquired by the self-vehicle-information acquiring section 114, and the target position set by the target-position setting section 116.

At step S204, the communication processor 112 of vehicle A identifies vehicles traveling in the direction (first particular direction) in which the communication data is to be sent based on the source-vehicle position and the target position. For this purpose, the communication processor 112 identifies directly communicatable vehicles traveling in a range of ±θ (30°, for example) with respect to the line from vehicle A to the center P of the area S. In the example shown in FIG. 1, the communication processor 112 identifies vehicles B2 and B3 as those to which the communication data is to be sent. Although vehicles B1, B4, and B5 are communicatable vehicles, they are out of the range specified above and hence are not identified.

At step S205, the communication processor 112 of vehicle A adds the header for each of the identified vehicles B2 and B3 to generate communication data and then the data-transmitting section 118 sends the communication data to vehicles B2 and B3.

In this manner, the vehicle-mounted terminal 100 in message-sending source vehicle A sends the communication data to particular vehicles B2 and B3 only.

(2) Operation of the Vehicle-mounted Terminal 100 in a Vehicle Other than Vehicle A FIG. 8 is a flowchart showing how a vehicle other than the message-sending source vehicle A operates when receiving communication data.

In the inter-vehicle communication network system according to the embodiment of the present invention, vehicles other than vehicle A relay communication data to vehicles traveling within the communication range in the particular direction if the communication data has not yet reached vehicle F2 closest to the center P of the area S, just as vehicle A does. Once the communication data reaches vehicle F2, it is broadcast to any vehicle, rather than particular destination vehicles. The operation of a vehicle which has received communication data is described in two cases: when the vehicle receives communication data that has not yet reached vehicle F2 (case (2-1) below) and when the vehicle receives communication data that has reached vehicle F2 (case (2-2) below).

(2-1) Vehicle Operation Before Communication Data Reaches Vehicle F2

Referring to FIG. 8, the communication processor 112 of a vehicle continuously monitors whether the data-receiving section 120 has received communication data from another vehicle (step S300). When the communication processor 112 determines that the data-receiving section 120 has received communication data from another vehicle ("YES" at step S300), the communication processor 112 checks whether the vehicle itself is a communication-partner vehicle (more correctly, a vehicle having a communication-partner vehicle-mounted terminal 100) (step S301). A communication-partner vehicle is a vehicle within the area S, and hence vehicles E1 to E3 and F1 to F5 in FIG. 1 are communication-partner vehicles in this embodiment of the present invention.

If the vehicle is a communication-partner vehicle, that is, any of vehicles E1 to E3 and F1 to F5 ("YES" at step S301), the application processor 300 of the vehicle performs specified processing according to the message contained in the received communication data (step S302). For example, if the message is a request for gathering nearby traffic conditions, the vehicle gathers nearby traffic conditions and sends back the information to vehicle A.

At step S303, the communication processor 112 of the vehicle determines whether the communication data should be relayed to another vehicle. When the communication data reaches any of communication-partner vehicles E1 to E3 and F1 to F5 and if no further data relay is necessary (for example, the purpose of vehicle A sending a message is fulfilled by the vehicle in the area S that has first received a message sending back the desired information in response to the message), namely, in the case of "NO" at step S303, the operation is completed.

If the receiving vehicle is not any of vehicles E1 to E3 and F1 to F5 ("NO" at step S301); or if the receiving vehicle is any of vehicles E1 to E3 and F1 to F5 ("YES" at step S301) and is further required to relay the communication data ("YES" at step S303), the communication processor 112 of the vehicle determines whether the received communication data is broadcasted data (step S304). This determination is done by checking to see if the destination address field in the header section of the received communication data, as shown in FIG. 4, contains a special value indicating broadcasting. Data communication through broadcasting does not occur until it reaches vehicle F2, closest to the center P of the area S, and therefore the flow goes to "NO" at step S304 in case (2-1).

At step S305, the communication processor 112 of the vehicle determines whether the vehicle itself is vehicle F2, that is, the vehicle closest to the center P of the area S. Since the vehicle itself is not vehicle F2 ("NO" at step S305) in case (2-1), the flow proceeds to the next step S306 where the communication processor 112 identifies a destination vehicle based on the source-vehicle position and the target position contained in the data section of the received communication data. From the viewpoint of the vehicle itself, the communication processor 112 identifies directly communicatable vehicles traveling in a range of ±θ (30°, for example) with respect to the line from vehicle A to the center P of the area S. From the viewpoint of, for example, vehicle C1 in FIG. 1, vehicle D2 is identified as a destination vehicle because it is located within a range of ±θ (30°, for example) with respect to the line from vehicle A to the center P of the area S. On the other hand, vehicle D1 is not identified as a destination vehicle because it is located in the communication area but is not included in the above-described particular range.

At step S307, the communication processor 112 of the vehicle generates communication data having the header section changed for destination vehicle D2 and then the data-transmitting section 118 sends the communication data to vehicle D2.

In this manner, the vehicle-mounted terminal 100 of each receiving vehicle relays communication data to another vehicle traveling in a particular direction towards the target position (center P of the area S) until the communication data reaches vehicle F2 closest to the target position.

(2-2) Vehicle Operation After Communication Data Reaches Vehicle F2

The flow from step S300 (of determining whether communication data has been received) to step S304 (of determining whether the received communication data is broadcasted data) is the same as in (2-1) described above.

When vehicle F2 traveling closest to the center P of the area S receives communication data sent from, for example, vehicle E2 in FIG. 1, vehicle F2 determines that the received communication data is not broadcasted data ("NO" at step S304) and then proceeds to step S305 to determine that vehicle F2 itself is the vehicle closest to the center P of the area S ("YES" at step S305). Accordingly, the communication processor 112 of vehicle F2 sets a special value indicating broadcasting in the destination address field in the header section of the received communication data and sets the identification number of the vehicle-mounted terminal 100 in vehicle F2 itself to the source address field in the same header section. Subsequently, the data-transmitting section 118 broadcasts the communication data with the header section changed to all vehicles traveling within the communication area (step S308).

The communication processor 112 of any vehicle that has received broadcasted communication data goes to "YES" at step S304 and changes the received communication data so as to set the identification number of its own vehicle-mounted terminal 100 to the source address field in the header section (but, leaves the destination address field untouched, i.e., retains the special value indicating broadcasting as is). Then, the data-transmitting section 118 of the vehicle broadcasts the communication data having the value only in the source address field changed to all vehicles within the communication area (step S308).

In this manner, once communication data reaches vehicle F2, which is closest to the center P of the area S, the vehicle-mounted terminal 100 in any vehicle which has received the communication data relays the communication data to all vehicles within the communication area through broadcasting. Thus, broadcasting should be subjected to some restriction to prevent endless repetition of broadcasting by limiting, for example, the number of times broadcasting is performed or the range within which broadcasting is performed (broadcasting is repeated as long as the vehicle-mounted terminal 100 that has received broadcasted communication data is located within the area S, for example).

As described so far, the inter-vehicle communication network system according to the embodiment of the present invention allows communication data from the vehicle-mounted terminal 100 in one vehicle to be relayed to the vehicle-mounted terminals 100 in other vehicles traveling in a particular direction only, thereby reducing the communication traffic in the entire inter-vehicle network system for efficient utilization of the communication band. In addition, the inter-vehicle communication network system allows communication data having reached a vehicle near the target position to be relayed through broadcasting, thereby ensuring that the communication data is sent to the vehicle-mounted terminals 100 in vehicles traveling within a particular area.

The particular data relay direction is from the vehicle-mounted terminal 100 in the source vehicle towards a target position (center P, for example) in the particular area S, and thus intermediary vehicles are specified based upon the position of the vehicle-mounted terminal 100 of the source vehicle and the target position. This approach ensures that communication data is sent towards the particular area S in which the vehicle-mounted terminal 100 of the destination vehicle is located.

Furthermore, the inter-vehicle communication network system allows communication data to be sent only in the particular direction until the data reaches the vehicle closest to the center P of the area S, thereby ensuring that the communication data is sent to all vehicles in the particular area S. The inter-vehicle communication network system also allows communication data to be sent to vehicles only in the particular direction until the data reaches the vehicle closest to the center P, thereby further reducing the communication traffic.

Communication data intended for the particular direction is relayed only to a specified vehicle-mounted terminal 100 in an intermediary vehicle, and therefore, there is a reduced processing load on the intermediary vehicle-mounted terminal 100 receiving communication data. When communication data is broadcast, vehicle-mounted terminals 100 in intermediary vehicles are not specified, and therefore, there is a reduced processing load on the vehicle-mounted terminal 100 sending communication data while still ensuring that the communication data can be sent to other vehicle-mounted terminals 100 in the vicinity thereof.

In addition, the number of times broadcasting is performed may be limited to a predetermined value or the range within which broadcasting is repeated may be limited only to vehicle-mounted terminals 100 within the particular area S. This preventive measure advantageously avoids endless transmission of unnecessary communication data, thus reducing the communication traffic for efficient utilization of the communication band.

The present invention has been described with reference to a preferred embodiment, but is not limited to that embodiment; various modifications are within the scope of the present invention. In the above-described embodiment, vehicle A in FIG. 1 sends communication data to vehicles within the area S. On the contrary, the present invention is also applicable to a case where a vehicle (vehicle F2, for example) within the area S which has received a message from vehicle A sends back a response message to vehicle A. For this purpose, it should be taken into consideration that the position of vehicle A changes while communication data is being exchanged. Thus, vehicle F2 needs to estimate when the response reaches vehicle A (estimated time of response arrival) and where vehicle A is located when it receives the communication data containing the response message (estimated driving position) using the communication processor 112, and then set this estimated driving position as the target position in the data section of the communication data, as shown in FIG. 4. In this manner, vehicle F2 is able to send the response in the direction (second particular direction) towards the target position thus determined. For example, if sending communication data containing a response message to vehicle A, vehicle F2 is able to calculate how long it takes to pass a message from vehicle F2 to vehicle A (one way) by subtracting the "transmission-start time" value contained in the received communication data from the time when vehicle F2 received the communication data. The communication processor 112 of vehicle F2 is then able to calculate the round trip time of communication data (that is, the time from when vehicle A sends communication data to when vehicle A receives communication data containing a response message) by multiplying this calculated time by two or by adding the processing time required for sending the response message to the calculated time multiplied by two. The communication data sent from vehicle A contains the planned driving route and the driving speed of vehicle A. Based on this planned driving route and driving speed, the communication processor 112 of vehicle F2 is able to estimate how much vehicle A moves over this round-trip period of time. When calculating the position of vehicle A, the communication processor 112 of vehicle F2 need not use the planned driving route and the driving speed contained in the received communication data; instead, the communication processor 112 may use the planned driving route and the average driving speed determined according to the width and road type of the planned driving route or a constant driving speed irrespective of the width and road type of the route.

As described above, the communication processor 112 of a receiving vehicle such as vehicle F2 sends message-containing communication data to the vehicle-mounted terminal 100 of the source vehicle, such as vehicle A, traveling along the planned driving route, whose information is contained in the received communication data. This is how vehicle F2 ensures that a response message is sent back to the traveling source vehicle, i.e., vehicle A in this embodiment. Communication data containing a response message is also relayed only in a particular direction up to a certain point and then broadcast beyond that point, whereby the communication traffic is further reduced for efficient utilization of the communication band while it is ensured that the communication data is sent back to the source terminal. The particular direction in which the communication data containing a response message is relayed is calculated as the direction in which vehicle A travels toward the estimated driving position on the planned driving route with an estimated time of response arrival when the response communication data will arrive at the vehicle-mounted terminal 100 of vehicle A. In other words, it is possible to determine an intermediary vehicle based on the position of vehicle F2 (the vehicle having the vehicle-mounted terminal 100 which sends back communication data containing a response message) and the estimated driving position of vehicle A, thereby ensuring that communication data is relayed back to vehicle A. Furthermore, the position of vehicle A, which travels as its vehicle-mounted terminal 100 receives from vehicle F2 the communication data containing a response message, can be estimated accurately, so that the vehicle-mounted terminal 100 of vehicle A does not fail to receive the communication data.

In the above-described embodiment, each vehicle in the inter-vehicle communication system acquires, at predetermined intervals, information regarding the nearby vehicles, that is, the positions of the nearby vehicles and the identification numbers of the vehicle-mounted terminals 100 in the nearby vehicles. Alternatively, each vehicle may acquire those items of information when sending communication data. In short, steps 100 and 101 in FIG. 5 may be moved between step S200 and step S204 in FIG. 7 or between step S300 and step S306 in FIG. 8.

In the above-described embodiment, communication data is broadcast only after it reaches vehicle F2, closest to the center P of the area S. Communication data may also be broadcast once it reaches the vehicle-mounted terminal 100 of any vehicle in the area S.

Furthermore, at least one of the communication range, communication channel, communication speed, and communication frequency of communication data may be changed between before and after the communication reaches vehicle F2.

Even in a situation where intermediary vehicles having vehicle-mounted terminals 100 are traveling relatively far away from one another and the area S is far away, setting the communication range of communication data in a particular direction (that is, the range before the data reaches vehicle F2) longer than the communication range of broadcasted communicated data (that is, the range after the data reaches vehicle F2) ensures that the communication data is relayed to the vehicle-mounted terminals 100 in vehicles traveling in the area S. Extending the communication range of one data transmission reduces the number of data relays and advantageously reduces the communication traffic. Solutions for making the communication range variable include changing the transmission power of the transmitting section 132 (made higher to extend or lower to reduce the communication range), the frequency or communication speed of a signal from the transmitting section 132 (made lower to extend the communication range), etc.

It becomes possible to relay communication data through different channels by making variable at least one of the communication range, communication channel, communication speed, and communication frequency of the communication data before and after the communication data reaches vehicle F2. This approach reduces extra communication traffic and prevents congestion. For example, if broadcasted communication data can be discriminated from non-broadcasted communication data of the same content by changing the communication channels, the broadcasted communication data can be selectively acquired, while the non-broadcasted communication data is discarded.

What is claimed is:

1. A method for relaying communication data from a source terminal to a destination terminal in a particular area via at least one intermediary terminal, the method comprising:

repeating relaying the communication data between two of the terminals such that the communication data is relayed only in a first particular direction from a first terminal to a second terminal, until the communication data reaches an intermediary terminal mounted in a vehicle in the particular area; and relaying the communication data in any direction, after the communication data reaches the intermediary terminal in the particular area;

wherein the communication data reaches the destination terminal.

2. The method according to claim 1, wherein the first particular direction is from a source terminal of the communication data to a target position in the particular area, one of the intermediary terminals which receives the communication data being determined based upon the position of the source terminal and the target position.

3. The method according to claim 2, wherein the target position is the center of the particular area.

4. The method according to claim 1, wherein said at least one vehicle in the particular area is the vehicle closest to the center of the particular area.

5. The method according to claim 1, wherein the communication data is relayed to an intermediary terminal in the first particular direction after the intermediary terminal is identified.

6. The method according to claim 1, wherein the communication data is relayed to an intermediary terminal in any direction through broadcasting without identifying the intermediary terminal.

7. The method according to claim 6, wherein broadcasting of the communication data is repeated a predetermined number of times of relaying.

8. The method according to claim 6, wherein broadcasting of the communication data is repeated as long as the intermediary terminal performing the broadcasting is in the particular area.

9. The method according to claim 1, wherein the communication data relayed to the destination terminal comprises a predetermined message and a planned driving route of the vehicle having a source terminal which has sent the communication data, and the destination terminal sends communication data containing a response message to the source terminal mounted in the vehicle traveling along the planned driving route.

10. The method according to claim 9, wherein relaying of the communication data containing the response message is repeated between two terminals such that the terminal that receives the response message containing communication data is located in a second particular direction until the response message containing communication data reaches an intermediary terminal near the source terminal in the vehicle traveling along the planned driving route and, after the response message containing communication data reaches the intermediary terminal near the source terminal, the response message containing communication data is relayed in any direction.

11. The method according to claim 10, wherein the second particular direction is towards an estimated driving position on the planned driving route, wherein the vehicle having the source terminal travels toward the estimated driving position with an estimated time of response arrival at which the response message containing communication data will approximately reach the source terminal, and an intermediary terminal which receives the response message containing communication data is determined based upon the position of the destination terminal and the estimated driving position.

12. The method according to claim 11, wherein the destination terminal calculates the estimated driving position based on the driving speed of the vehicle having the source terminal and the time from when the source terminal sent the communication data.

13. The method according to claim 1, wherein a communication range of communication data relay in the first particular direction is longer than a communication range of communication data relay in any direction.

14. The method according to claim 1, wherein communication data relay in the first particular direction differs from communication data relay in any direction in a channel, a communication speed, or a communication frequency.

15. An inter-vehicle communication system for sending communication data from a source terminal to a destination terminal in a particular area via at least one intermediary terminal mounted in a vehicle, each intermediary terminal comprising:
    a first receiving segment for receiving communication data sent from the source terminal or another of the intermediary terminals;
    a communication processor operable to receive the communication data from the first receiving segment, the communication processor comprising:
        a determining segment for determining whether or not a condition is satisfied, the condition is satisfied when the intermediary terminal itself is in the particular area or when the communication data is received from another intermediary terminal in the particular area; and
        an intermediary target setting segment for identifying another intermediary terminal in any direction or the destination terminal when the determining segment determines that the condition is satisfied or for identifying another intermediary terminal in a first particular direction or the destination terminal when the determining segment determines that the condition is not satisfied; and
    a first sending segment interconnected with the communication processor for sending the communication data to the intermediary terminal or the destination terminal as determined by the intermediary target setting segment, wherein when the condition is not satisfied and the communication data is relayed between two intermediary terminals, the communication data is relayed only in the first particular direction.

16. The inter-vehicle communication system according to claim 15, said each intermediary terminal further comprising a terminal detecting segment for detecting other intermediary terminals or the destination terminal in a communication range at predetermined intervals.

17. The inter-vehicle communication system according to claim 15, wherein the communication data sent from the source terminal comprises the vehicle position of the vehicle having the source terminal and a target position in the particular area, and the intermediary target setting segment determines the first particular direction based upon the vehicle position and the target position.

18. The inter-vehicle communication system according to claim 17, wherein the target position is set with a navigation unit.

19. The inter-vehicle communication system according to claim 15, wherein the communication data sent from the source terminal comprises a planned driving route of the vehicle having the source terminal, and the destination terminal comprises a second receiving segment for receiving the communication data via at least one intermediary terminal and a second sending segment for sending communication data containing a response message to the source terminal mounted in a vehicle traveling along the planned driving route.

20. The inter-vehicle communication system according to claim 19, wherein the communication data sent from the source terminal further comprises a transmission start time when the communication data was sent; the destination terminal further comprises an estimated arrival time calculating segment for calculating an estimated time of response arrival at which the communication data containing the response message will approximately reach the source terminal based upon the planned driving route, the transmission start time, and the driving speed of the vehicle having the source terminal; the planned driving route and the driving speed are contained in the communication data received by the second receiving segment; the communication data sent from the second sending segment in the destination terminal comprises an estimated driving position on the planned driving route; and the intermediary target setting segment of one of the intermediary terminals which receives the communication data containing the response message determines a second particular direction in which the communication data is relayed based upon the position of the destination terminal and the estimated driving position and, relays the communication data to another intermediary terminal in the second particular direction.

21. A method for relaying a response message from a destination terminal to a source terminal via at least one intermediary terminal, the method comprising:
    relaying communication data from a source terminal to a destination terminal;
    the destination terminal generating a response message; and
    repeatedly relaying the response message between two of the terminals such that the response message is relayed only in a particular direction from a first terminal to a second terminal until the response message reaches an intermediary terminal near the source terminal in a vehicle traveling along a planned driving route and, after the response message reaches the intermediary terminal near the source terminal, the response message is relayed in any direction;
    wherein the response message reaches the source vehicle.

22. The method according to claim 21, wherein the particular direction is towards an estimated driving position on the planned driving route, wherein the vehicle having the source terminal travels toward the estimated driving position with an estimated time of response arrival at which the response message will approximately reach the source terminal, and an intermediary terminal which receives the response message is determined based upon the position of the destination terminal and the estimated driving position.

* * * * *